United States Patent
Uematsu

(10) Patent No.: US 6,606,658 B1
(45) Date of Patent: Aug. 12, 2003

(54) APPARATUS AND METHOD FOR SERVER RESOURCE USAGE DISPLAY BY COMPARISON OF RESOURCE BENCHMARKS TO DETERMINE AVAILABLE PERFORMANCE

(75) Inventor: Toshiaki Uematsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/041,961

(22) Filed: Mar. 13, 1998

(30) Foreign Application Priority Data

Oct. 17, 1997 (JP) .............................. 9-285625

(51) Int. Cl.[7] .......................................... G06F 15/173
(52) U.S. Cl. ...................... 709/225; 709/226; 709/224; 709/223
(58) Field of Search ................................ 709/220, 224, 709/100, 102, 104, 105, 223, 225, 226; 370/241, 254

(56) References Cited

U.S. PATENT DOCUMENTS 5,603,029 A * 2/1997 Aman et al. ................. 707/200
5,668,995 A * 9/1997 Bhat ............................ 703/23

(List continued on next page.)

OTHER PUBLICATIONS

Dave Sill, Benchmark FAQ Version 0.6, Mar. 28, 1995.*
Dave Sill, Benchmark FAQ Version 0.6, Mar. 1995.*
Bowden et al., "Performance Evaluation in Network Computers", Jun. 1973.*
Abbas Rafii, "Structure and Application of a Measurement Tool—Sampler/3000", 1981.*
Michael B. Jones, Daniela Rosu, Marel–Catalin Rosu, "CPU Reservations and Time Constraints: Efficient, Predictable Scheduling of Independent Activities", Oct. 1997.*
Takefusa et al., "Multi–Client LAN?WAN Performance Analysis of Ninf: a High–Performance Global Computing System", 1997.*
Howard et al., "Scale and Performance in a Distributed File System", 1988.*
Thekkath et al., "Frangipani: A Scalable Distributed File System", Oct. 1997.*

*Primary Examiner*—Robert B. Harrell
*Assistant Examiner*—William C. Vaughn, Jr.
(74) *Attorney, Agent, or Firm*—Staas & Halsey, LLP

(57) ABSTRACT

To display resource usage status of each server in a network in such a manner as to enable comparison with other servers. In a network in which a plurality of servers and a plurality of clients are connected via a data processing server in such a manner as to be able to communicate with each other, a display method for displaying resource usage status of each of the plurality of servers is provided, wherein the data processing server comprises: a measuring means for measuring the usage of resources in each of the plurality of server based on common criteria; and a display means for displaying the results of the measurements made by the measuring means on a display at each of the plurality of clients. The data processing server includes: a processing capacity ratio management table for storing processing capacity ratios measured on the plurality of servers for CPU, memory, and disk by using common criteria; and a resource usage status management table for storing usage percentage and free percentage information representing the status of CPU, memory, and disk usage in each server, the information being taken at predetermined intervals of time.

15 Claims, 7 Drawing Sheets

U.S. PATENT DOCUMENTS

| | | | | |
|---|---|---|---|---|
| 5,675,739 A | * | 10/1997 | Eilert et al. | 709/101 |
| 5,758,071 A | * | 5/1998 | Burgess et al. | 709/220 |
| 5,761,091 A | * | 6/1998 | Agrawal et al. | 702/186 |
| 5,774,719 A | * | 6/1998 | Bowen | 395/680 |
| 5,796,633 A | * | 8/1998 | Burgess et al. | 364/551.01 |
| 5,799,286 A | * | 8/1998 | Morgan et al. | 705/30 |
| 5,835,765 A | * | 11/1998 | Matsumoto | 395/672 |
| 5,848,270 A | * | 12/1998 | DeLuca et al. | 709/102 |
| 5,854,754 A | * | 12/1998 | Cabrera et al. | 703/2 |
| 5,881,238 A | * | 3/1999 | Aman et al. | 709/226 |
| 5,898,870 A | * | 4/1999 | Okuda et al. | 709/104 |
| 5,930,497 A | * | 7/1999 | Cherian et al. | 395/500 |
| 5,948,065 A | * | 9/1999 | Eilert et al. | 709/226 |
| 5,949,976 A | * | 9/1999 | Chappelle | 709/224 |
| 5,956,662 A | * | 9/1999 | Hemker et al. | 702/182 |
| 5,958,009 A | * | 9/1999 | Friedrich et al. | 709/224 |
| 5,958,010 A | * | 9/1999 | Agarwal et al. | 709/224 |
| 5,961,596 A | * | 10/1999 | Takubo et al. | 709/224 |
| 5,963,731 A | * | 10/1999 | Sagawa et al. | 703/6 |
| 5,978,844 A | * | 11/1999 | Tsuchiya et al. | 709/221 |
| 6,018,619 A | * | 1/2000 | Allard et al. | 709/224 |
| 6,070,190 A | * | 5/2000 | Reps et al. | 709/203 |
| 6,076,106 A | * | 6/2000 | Hamner et al. | 709/223 |
| 6,078,953 A | * | 6/2000 | Vaid et al. | 370/235 |
| 6,078,955 A | * | 6/2000 | Konno et al. | 709/224 |
| 6,148,335 A | * | 11/2000 | Haggard et al. | 709/224 |
| 6,154,787 A | * | 11/2000 | Urevig et al. | 710/8 |
| 6,173,322 B1 | * | 1/2001 | Hu | 709/224 |
| 6,219,708 B1 | * | 4/2001 | Martenson | 709/226 |
| 6,412,026 B1 | * | 6/2002 | Graf | 709/208 |

* cited by examiner

Fig. 6
|  | CPU USAGE PERCENTAGE | CPU FREE PERCENTAGE |
|---|---|---|
| COMPUTING SERVER 1 | 30% | 70% |
| COMPUTING SERVER 2 | 60% | 40% |
| COMPUTING SERVER 3 | 80% | 20% |
Fig. 7A
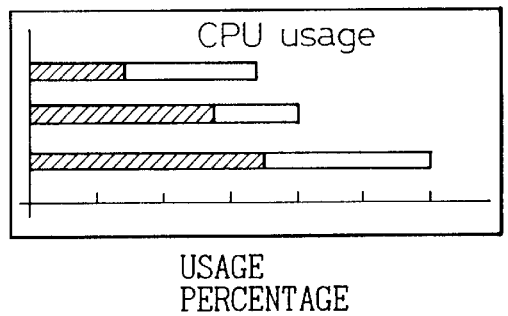
Fig. 7B
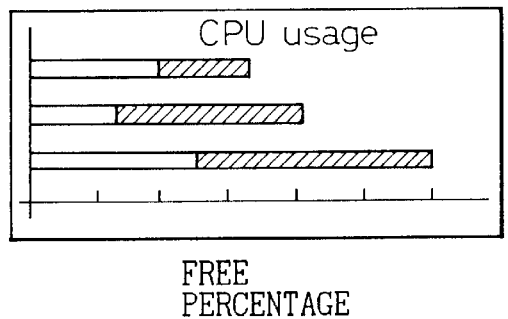
Fig. 7C
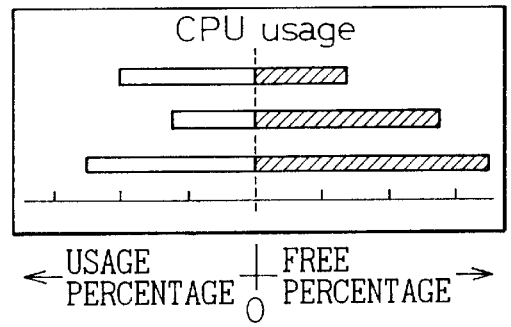

APPARATUS AND METHOD FOR SERVER RESOURCE USAGE DISPLAY BY COMPARISON OF RESOURCE BENCHMARKS TO DETERMINE AVAILABLE PERFORMANCE

BACKGROUND OF THE INVENTION

1. Field of the Invention

The present invention relates to a method for displaying server resource usage status in a network in which a plurality of servers and a plurality of clients are connected in such a manner as to be able to communicate with each other, and a recording medium for use with the same, and more particularly to a server resource usage display method for displaying usage percentage and free percentage representing the status of CPU, memory, and disk usage in a visually comprehensible form by considering the CPU, memory, and disk processing capacity of each server, and a recording medium for use with the same.

2. Description of the Related Art

In a prior art method for displaying resource usage status of each server in a network in which a plurality of servers and a plurality of clients are connected via a data processing server in such a manner as to be able to communicate with each other, the usage status of resources such as the CPU and memory of each server in the network is displayed in the form of a graph on the CRT screen at the requesting client by executing a system management program stored in a memory of the data processing server.

FIG. 9 is a diagram showing the CPU usage percentage and free percentage on three computing servers displayed in accordance with the display method of the prior art. In FIG. 9, CPU usage percentage on each computing server is indicated by a shaded bar, and CPU free percentage by a blank bar. As shown in FIG. 9, a quick overview of the CPU usage and free status on each server can be obtained easily from the CRT screen at the client.

The above prior art display method, however, does not present the status display by considering the processing capacity of the CPU, memory, or disk in each server, but simply displays the usage status of each resource, for example, CPU usage, specific to each of the plurality of servers. More specifically, the prior art method displays the resource usage status by measuring resource usage on each individual server using criteria specific to that particular server or yardsticks exclusive to that server. The resulting problem is therefore that while the resource usage status of each individual server can be displayed, the prior art method cannot provide a comparison of resource usage status between different servers. Stated more specifically, the problem with the prior art has been the inability to quickly and easily determine from a client's CRT screen which server has more capacity available and is therefore able to execute a job in a shorter time when viewed from the entire network.

SUMMARY OF THE INVENTION

The invention is aimed at solving the above problem, and its object is to provide a server resource usage display method that displays resource usage status in such a manner as to enable comparison between different servers in a network, and a recording medium for use with the same.

FIG. 1 is a diagram showing the basic configuration of the present invention. In a network (communication line) 4 in which a plurality of servers 1-1, 1-2, . . . , 1-m and a plurality of clients 2-1, 2-2, . . . , 2-n are connected via a data processing server 3 in such a manner as to be able to communicate with each other, the present invention that solves the above problem provides a display method for displaying resource usage status of each of the plurality of servers, wherein the data processing server 3 comprises: a measuring means 3a for measuring the usage of resources in each of the plurality of server based on common criteria; and a display means 3b for displaying the results of the measurements made by the measuring means 3a on a display (not shown) at each of the plurality of clients.

With the above configuration, since the measuring means 3a measures the usage of resources in each of the plurality of servers based on common criteria, and the display means 3b displays the results of the measurements on the display at each client, the user of each client can compare the resource usage status between the servers in the network.

In the server resource usage display method according to the present invention, the data processing server 3 includes: a processing capacity ratio management table 3c for storing processing capacity ratios measured on the plurality of servers for at least one resource, CPU, memory, or disk by using common criteria; and a resource usage status management table 3d for storing at least one of two types of usage information, usage percentage or free percentage, representing the status of CPU, memory, and disk usage in each of the plurality of servers, the usage percentage and free percentage being taken at predetermined intervals of time.

With the above configuration, the processing capacity of the CPU, memory, and disk can be compared between the plurality of servers by using the processing capacity ratio management table 3c, and the status of CPU, memory, and disk usage represented by usage percentage and free percentage can be compared between the plurality of servers by using the resource usage status management table 3d.

In the server resource usage display method according to the present invention, the data processing server 3 includes means for updating the processing capacity ratios stored in the processing capacity ratio management table each time a change occurs in the processing capacity of the CPU, memory, or disk in any one of the plurality of servers.

In the server resource usage display method according to the present invention, the display means displays the results of the measurements from the measuring means in a visualized form, for example, in the form of a bar graph or pie chart, on a display screen at each of the plurality of clients.

In the server resource usage display method according to the present invention, the display means displays the status of resource usage in each server, based on the usage percentage of at least one resource, the CPU, memory, or disk in the server.

In the server resource usage display method according to the present invention, the display means displays the status of resource usage in each server, based on the free percentage of at least one resource, the CPU, memory, or disk in the server.

In the server resource usage display method according to the present invention, the data processing server determines the CPU processing capacity of each server on the basis of the processing time required when an identical program is run on the server a prescribed number of times.

In the server resource usage display method according to the present invention, the data processing server determines the memory processing capacity of each server on the basis of the processing time required when identical data is written to and read from the server a prescribed number of times.

In the server resource usage display method according to the present invention, the data processing server determines the disk processing capacity of each server on the basis of the processing time required when identical data is written to and read from the server a prescribed number of times.

According to the present invention that solves the above problem, there is also provided, in a network in which a plurality of servers and a plurality of clients are connected via a data processing server in such a manner as to be able to communicate with each other, a computer readable recording medium for the data processing server as a computer to display resource usage status of each of the plurality of servers, wherein the recording medium holds thereon a program for having the data processing server computer implement: measuring means for measuring the usage of resources in each of the plurality of servers based on common criteria; and display means for displaying the results of the measurements made by the measuring means on a display at each of the plurality of clients.

The recording medium of the present invention also holds thereon a program for having the data processing server computer store in storage means therein: a processing capacity ratio management table for storing processing capacity ratios measured on the plurality of servers for at least one resource, CPU, memory, or disk by using common criteria; and a resource usage status management table for storing at least one of two types of usage information, usage percentage or free percentage, representing the status of CPU, memory, and disk usage in each of the plurality of servers, the usage percentage and free percentage being taken at predetermined intervals of time.

The recording medium of the present invention also holds thereon a program for having the data processing server computer implement means for updating the processing capacity ratios stored in the processing capacity ratio management table each time a change occurs in the processing capacity of the CPU, memory, or disk in any one of the plurality of servers.

BRIEF DESCRIPTION OF THE DRAWINGS

The present invention will be more clearly understood from the description as set forth below with reference to the accompanying drawings, wherein:

FIG. 6 is a diagram showing a resource usage status management table according to the present invention;

FIG. 7A is a diagram showing the CPU usage status of computing servers displayed in terms of usage percentage in accordance with the display method of the present invention;

FIG. 7B is a diagram showing the CPU usage status of computing servers displayed in terms of free percentage in accordance with the display method of the present invention;

FIG. 7C is a diagram showing the CPU usage status of computing servers displayed in terms of both usage percentage and free percentage in accordance with the display method of the present invention;

DESCRIPTION OF THE PREFERRED EMBODIMENTS

The preferred embodiments of the present invention will be described below with reference to the accompanying drawings.

Figure 1:
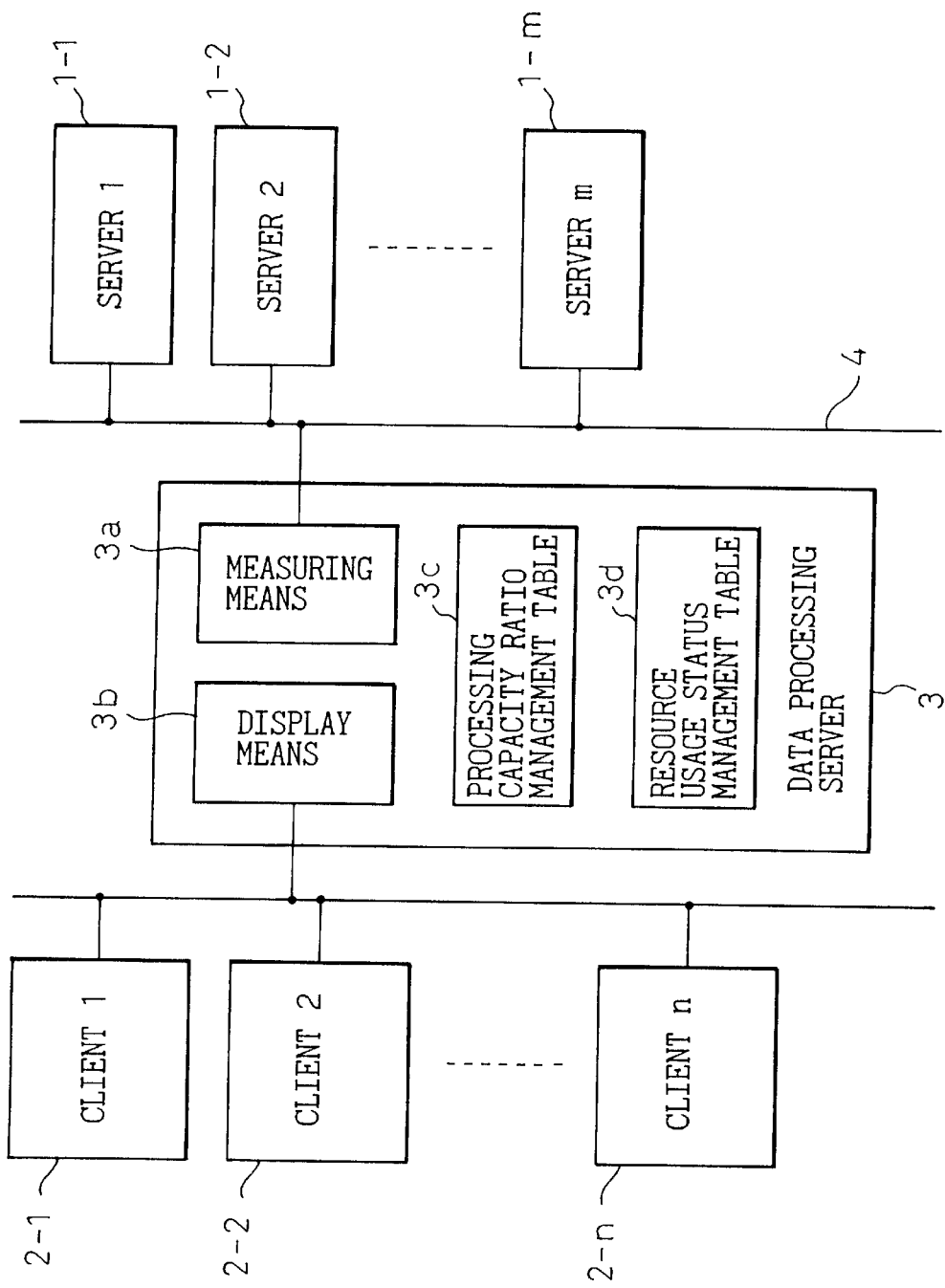
FIG. 1 is a diagram showing the basic configuration of the present invention.
Figure 2:
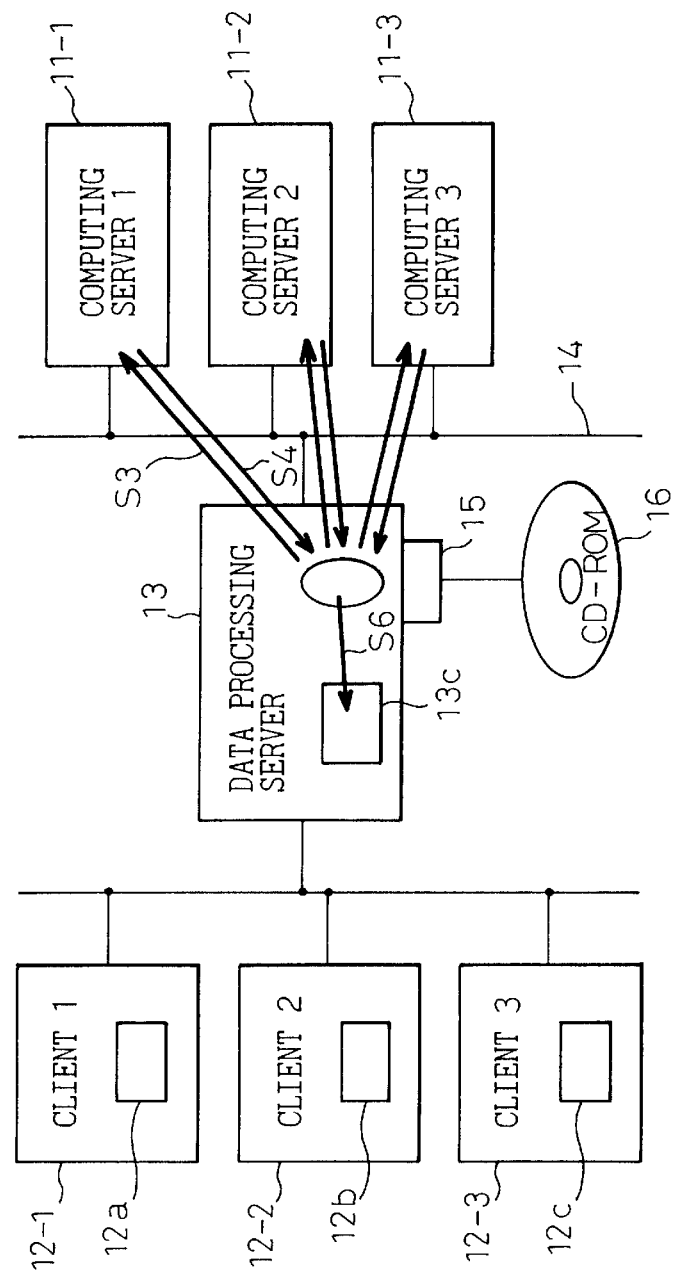
FIG. 2A is a diagram illustrating the process for creating a processing capacity ratio management table according to the present invention.
FIG. 2B is a diagram showing the processing capacity ratio management table according to the present invention.

FIG. 2A is a diagram illustrating the process for creating a processing capacity ratio management table according to the present invention, and FIG. 2B is the processing capacity ratio management table of the present invention. Throughout the figures hereinafter given, the same parts are designated by the same reference numerals. In the embodiment shown in FIG. 2A, three computing servers 11-1, 11-2, and 11-3 and three clients 12-1, 12-2, and 12-3 are connected via a data processing server 13 in such a manner as to be able to communicate with each other over a network 14. Here, the computing servers 11-1, 11-2, and 11-3, the clients 12-1, 12-2, and 12-3, and the data processing server 13 are stand-alone computers or workstations, and the relationship between the servers and clients in the network 14 complies with that of a client/server system. When displaying the resource usage status of each computing server on the CRT screen (not shown) at each client by executing a data display program 12a–12c at the client under the control of a system management program stored in the data processing server 13, if the display is to be presented so that the processing capacity of the CPU, memory, disk, etc. can be compared between the plurality of computing servers, the processing capacity ratio management table must be created first. The process for creating the processing capacity ratio management table will be described below.

The processing capacity ratio management table 13c shown in FIG. 2A stores data representing the CPU and memory processing capacities of the computing servers 11-1, 11-2, and 11-3, as shown in enlarged formed in FIG. 2B. The processing capacity of each of the plurality of servers is obtained by executing performance measuring programs. The performance measuring program for measuring the CPU processing capacity of each of the plurality of servers measures the processing times required, for example, when an identical program is executed on the computing servers 11-1, 11-2, and 11-3 from the data processing server 13 a prescribed number of times, for example, 100 times. The results of the measurements made on the computing servers are compared as follows. In the example shown in FIG. 2B, when the CPU processing time on an arbitrary computing server, for example, the computing server 11-1, is represented by 1, the processing time on the computing server 11-2 is ½ and that of the computing server 11-3 is ⅓. Accordingly, when the CPU processing capacity of the computing server 11-1 is denoted by x, then the CPU processing capacity of the computing server 11-2 is 2x and that of the computing server 11-3 is 3x.

On the other hand, the performance measuring program for measuring the memory processing capacity of each of the plurality of servers measures the processing times required, for example, when identical data is written to and read from the respective computing servers 11-1, 11-2, and 11-3 from the data processing server 13 a prescribed number of times, for example, 100 times. The results of the measurements made on the computing servers are compared as follows. In the example shown in FIG. 2B, when the memory processing time on an arbitrary computing server, for example, the computing server 11-2, is represented by 1, the processing time on the computing server 11-1 is ½ and that of the computing server 11-3 is ⅓. Accordingly, when the memory processing capacity of the computing server 11-2 is denoted by y, then the processing capacity of the computing server 11-1 is 2y and that of the computing server 11-3 is 3y.

Further, though not shown here, the disk processing capacity of each of the plurality of servers can be obtained by a performance measuring program similar to that for measuring the memory processing capacity. It is thus possible to know the processing capacity of each server in terms of its CPU, memory, and disk. This provides a useful means when choosing a computing server suitable for a job the client wishes to execute.

In FIG. 2A, the data processing server 13 is equipped with a reading device 15 for reading a recording medium 16 such as a CD-ROM or a floppy disk and, by performing a prescribed operation, reads the various programs (described above or to be described later) recorded on the recording medium 16 such as a CD-ROM or a floppy disk and loads them onto an auxiliary storage device not shown or loads programs stored on another client's recording medium such as a magnetic disk onto an auxiliary storage device of the data processing server 13 via the network (communication line) 14. Of course, an operator may write a program directly into the main storage device, for example, a RAM, of the data processing server 13, and the program may then be loaded onto the auxiliary storage device. After that, the programs stored on the auxiliary storage device is loaded as necessary into the main storage device by the processing of the CPU (not shown) of the data processing server 13.

Figure 3:
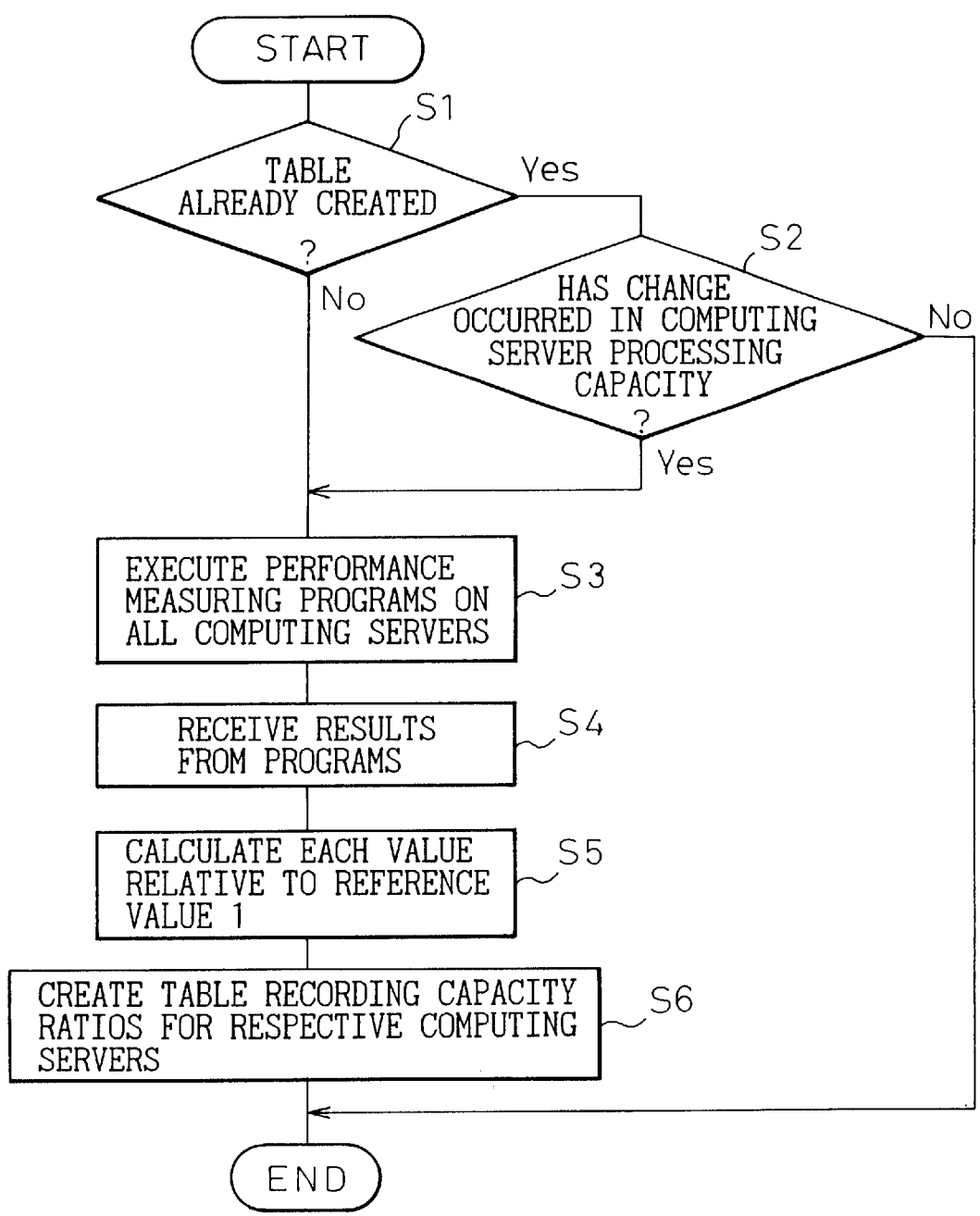
FIG. 3 is a flowchart illustrating the process for creating the processing capacity ratio management table.

FIG. 3 is a flowchart illustrating the process for creating the processing capacity ratio management table. The data processing server 13 carries out the flowchart shown in FIG. 3 and updates data stored in the processing capacity ratio management table whenever a change occurs in the processing capacity of any one of the computing servers. First, in step S1, the data processing server makes a decision as to whether the processing capacity ratio management table has already been created or not. If it has already been created, the process proceeds to step S2; otherwise, the process proceeds to step S3.

In step S2, the data processing server makes a decision as to whether a change has occurred in the processing capacity of any one of the computing servers in the network. This decision is made based on the status of a flag provided in each computing server, the flag being set when a new computing server is added or when a change occurs in the processing capacity of the computing server already registered in the processing capacity ratio management table and reset when the processing capacity ratio table is updated.

In step S3, the data processing server executes the earlier described performance measuring programs on all the computing servers in the network and then proceeds to step S4. In step S4, the data processing server receives from each computing server the results of the measurements of the computing server's processing capacity obtained by executing the performance measuring programs. In step S5, the processing capacity of each computing server is calculated as a ratio relative to that of the reference computing server which is represented by 1. In step S6, the processing capacity ratio of each computing server is entered into the processing capacity ratio management table.

Next, a description will be given of the flow of resource usage information (resource information) from all the computing servers; this information is processed by considering the processing capacities of the respective computing server, and displayed on the CRT screen at a designated client.

Figure 4:
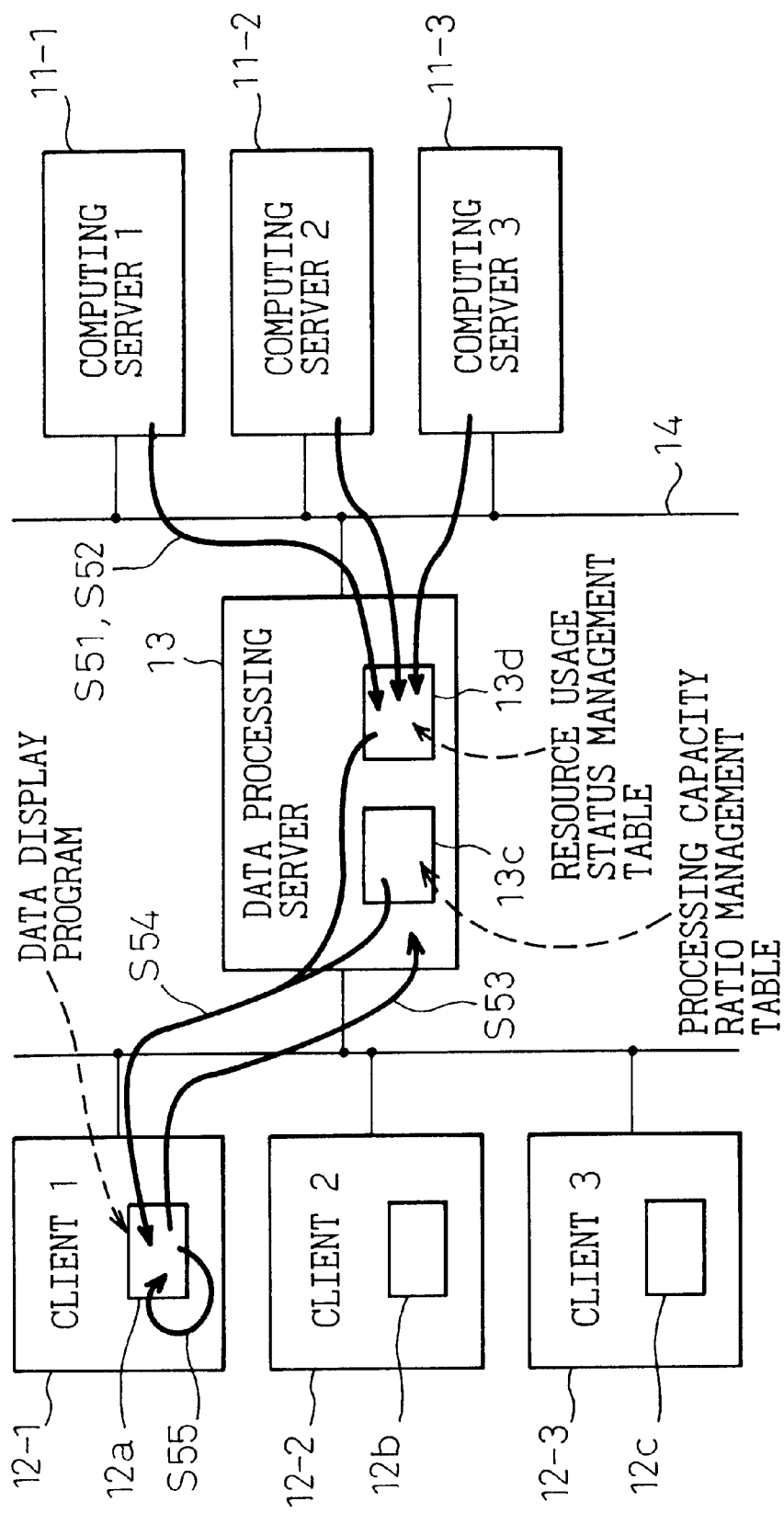
FIG. 4 is a diagram showing resource information flow from all computing servers in a network.
Figure 5:
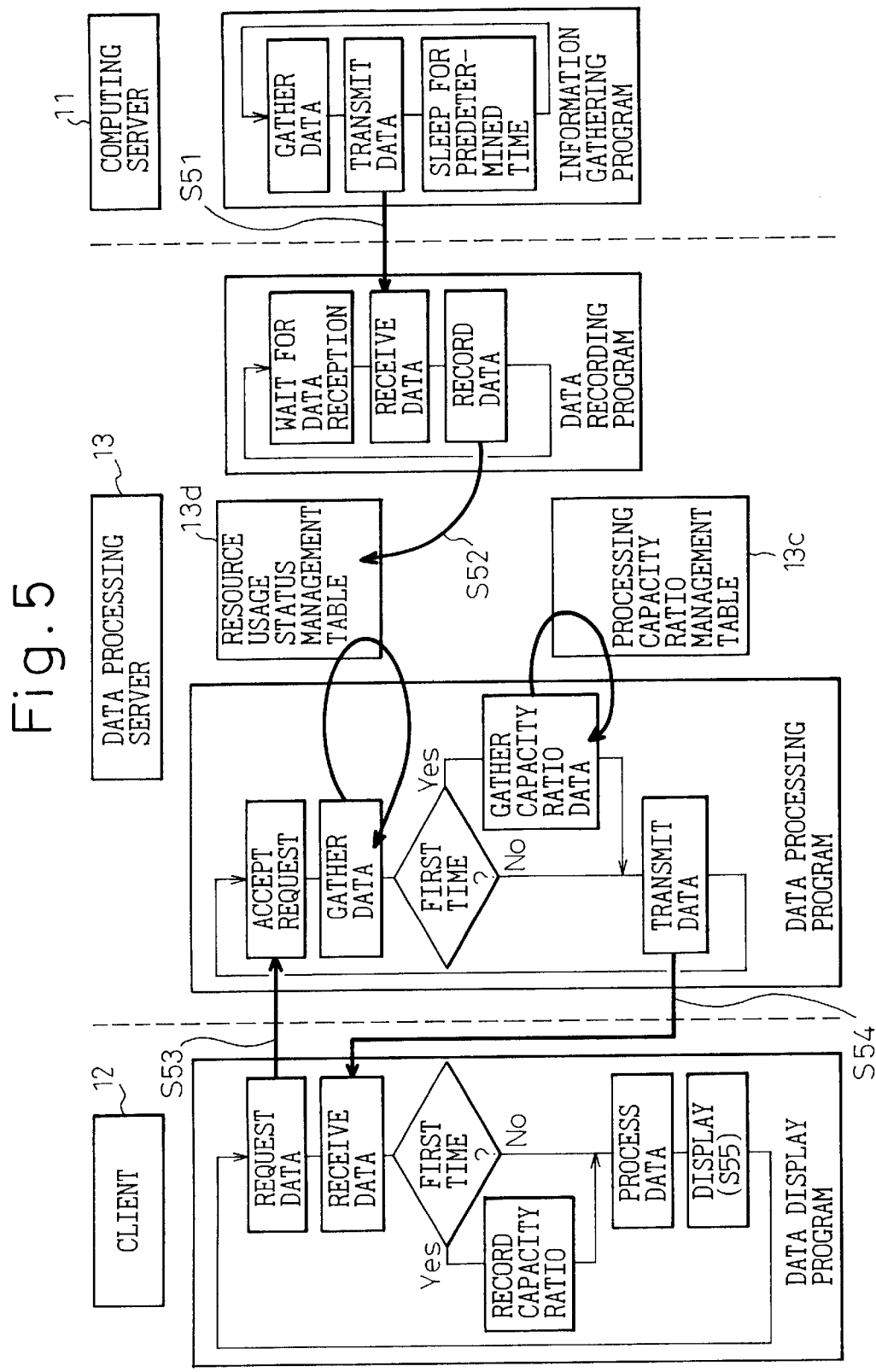
FIG. 5 is a diagram showing resource information flow from a single computing server in a network.

FIG. 4 is a diagram showing the flow of the resource information from all the computing servers in the network, FIG. 5 is a diagram showing the flow of the resource information from a single computing server in the network, and FIG. 6 is a diagram showing a resource usage status management table according to the present invention. The data processing server 13 contains a resource usage status management table 13d similar to the one shown in FIG. 6. Data representing the usage percentage and free percentage per unit time for the CPU and memory are collected from each computing server at predetermined intervals of time (step S51) and are stored in the resource usage status management table 13d (step S52). The data processing server 13 has a system management program. The system management program performs data transfers between each client and each computing server in cooperation with the programs shown in FIG. 5, that is, the data display program in each client, the information gathering program in each computing server, and the data processing program and data recording program in the data processing server 13.

The information gathering program in each computing server monitors the resource usage status of the computing server and transmits the resource usage status, i.e., the data representing the usage percentage and free percentage of the CPU and memory of the computing server, to the data processing server at predetermined intervals of time. This information gathering program is stored on the recording medium 16 and is loaded onto the auxiliary storage device of the computing server via the reading device 15 on the data processing server 13.

The data recording program receives the CPU and memory usage percentage and free percentage data from each computing server and updates the corresponding data in the resource usage status management table.

The data processing program, in response to a data request from a client, transmits data stored in the resource usage status management table and processing capacity ratio management table to the requesting client. The data stored in the processing capacity ratio management table need to be transmitted to the client only when the processing capacity ratios have been undated since the last transmission.

The data display program receives the data stored in the resource usage status management table and processing capacity ratio management table, transmitted from the data processing server, and displays the data in the form of a graph on the CRT screen at the client through a graphical user interface (GUI) after processing the data in such a manner as to enable comparison of the CPU and memory usage and free percentage between the servers by considering the processing capacity ratio of each computing server. The data processing here means, for example, multiplying the CPU processing capacity ratio stored in the processing capacity ratio management table by the CPU usage percentage stored in the resource usage status management table. When the results of the calculations are displayed on the client's CRT screen, the processing capacities of the respective computing servers can be compared based using common criteria. This enables the user of the client to determine quickly and easily which computing server in the network has more capacity available.

FIG. 7A is a diagram showing the CPU usage status of the respective computing servers displayed in terms of usage percentage in accordance with the display method of the present invention, FIG. 7B is a diagram showing the CPU usage status of the respective computing servers displayed in terms of free percentage, and FIG. 7C is a diagram showing the CPU usage status of the respective computing servers in terms of both usage percentage and free percentage. The graphs shown in FIGS. 7A to 7C display the CPU usage percentage and free percentage by comparing the processing capacity between the computing servers using the same criteria. Therefore, by comparing the bar heights, one can see from FIG. 7A that the CPU usage percentage is high in the order of the computing servers 3, 2, and 1, from FIG. 7B that the CPU free percentage is high in the order of the computing servers 3, 1, and 2, and from FIG. 7C that the CPU usage percentage is high in the order of the computing servers 3, 2, and 1 and the CPU free percentage is high in the order of the computing servers 3, 1, and 2.

Figure 8:
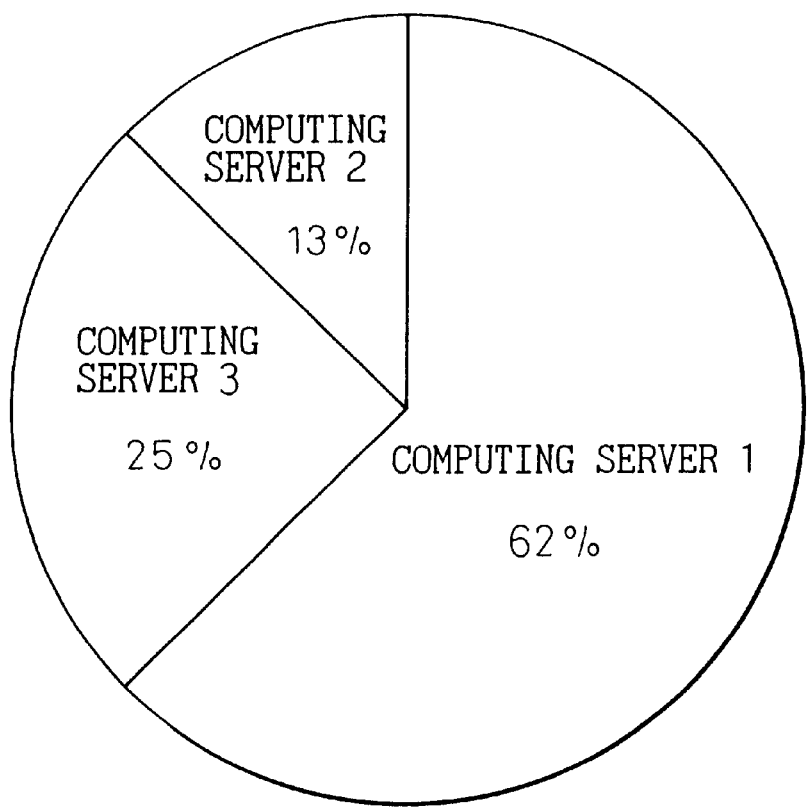
FIG. 8 is a diagram showing the CPU usage status of three computing servers displayed in the form of a pie chart in accordance with the display method of the present invention.
Figure 9:
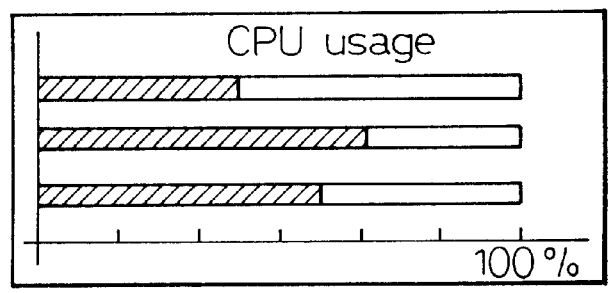
FIG. 9 is a diagram showing the CPU usage percentage and free percentage for three computing servers displayed in accordance with a prior art display method.

FIG. 8 is a diagram showing the CPU usage status of the three computing servers displayed in the form of a pie chart in accordance with the display method of the present invention. From FIG. 8, it can be seen that the CPU usage is high in the order of the computing servers 1, 3, and 2.

In this way, according to the display method of the present invention, since the CPU processing capacities of the respective computing servers, for example, in terms of CPU usage percentage and free percentage, are displayed in the form of a bar graph or a pie chart, the user of each client can visually grasp the usage status and can determine quickly and easily which computing server has more capacity available.

If the rate of charge made to the client for use of a computing server, for example, the unit price of charge (usage charge per unit time), is made proportional to the CPU processing capacity of the computing server and is displayed accordingly, the user of the client can see the unit price of charge for each computing server at a glance and can choose the computing server he wishes to use according to his budget.

As described above, according to the present invention, a server resource usage display method is provided that measures the resource usage status of the respective servers in a network by using the same criteria and displays the results in such a manner as to enable comparison between the servers. The invention also provides a recording medium for use with the same.

It will be understood by those skilled in the art that the foregoing descriptions are preferred embodiments of the disclosed method and that various changes and modifications may be made to the invention without departing the sprint and scope thereof.

What is claimed is:

1. In a network in which a plurality of computing servers, having different performance capabilities and each containing a CPU, memory and a disk, and a plurality of clients are connected via a data processing server so as to communicate with each other, a server resource usage display device for displaying resource usage status of each of said plurality of servers is provided and said data processing server comprises:

means for measuring processing capacity ratios among said plurality of servers using common criteria applied to each server for at least one of the CPU, the memory and the disk as resources;

means for repeatedly measuring resource usage status data for each of said plurality of servers at a predetermined time interval with respect to at least one of the CPU, the memory and the disk;

means for applying said processing capacity ratios onto said resource usage status data so as to obtain comparable resource usage data among said plurality of servers; and means for displaying said comparable resource usage status data among said plurality of servers at each of said plurality of clients.

2. A method for displaying resource usage status of computing servers in a network in which a plurality of computing servers having different performance capabilities and containing a CPU, memory and a disk and a plurality of clients are connected via a data processing server so as to communicate with each other, comprising:

measuring processing capacity ratios among said plurality of computing servers using common criteria applied to each server for at least one of the CPU, the memory and the disk as resources;

repeatedly measuring resource usage status data of each of said computing servers at a predetermined time interval with respect to at least one of the CPU, the memory and the disk;

applying said processing capacity ratios onto said resource usage status data so as to obtain comparable resource usage status data from among said computing servers; and displaying said comparable resource usage status data from among said computing servers at each of said clients.

3. A program storage medium readable by a machine, tangibly embodying a program of instructions executable by the machine to perform steps for displaying resource usage status of computing servers in a network in which a plurality of said computing servers having different performance capabilities and containing a CPU, memory and a disk and a plurality of clients are connected via a data processing server so as to communicate with each other, said steps comprising:

measuring processing capacity ratios among said plurality of computing servers using common criteria applied to each server for at least one of the CPU, the memory and the disk as resources;

repeatedly measuring resource usage status data of each of said computing servers at a predetermined time interval with respect to at least one of the CPU, the memory and the disk;

applying said processing capacity ratios onto said resource usage status data so as to obtain comparable resource usage status data among said computing servers; and displaying said comparable resource usage status data among said computing servers at each of said clients.

4. A server usage display apparatus for displaying resource usage status of computing servers in a network in which a plurality of said computing servers having different performance capabilities and containing a CPU, memory and a disk and a plurality of clients are connected via a data processing server so as to communicate with each other, comprising:

means for measuring processing capacity ratios among said plurality of computing servers using common criteria applied to each server for at least one of the CPU, the memory and the disk as resources;

means for repeatedly measuring resource usage status data of each of said computing servers at a predetermined time interval with respect to at least one of the CPU, the memory and the disk;

means for applying said processing capacity ratios onto said resource usage status data so as to obtain comparable resource usage status data among said computing servers; and means for displaying said comparable resource usage status data among said computing servers at each of said clients.

5. A server resource usage display apparatus for displaying resource usage status of computing servers in a network in which a plurality of said computing servers having different performance capabilities and a plurality of clients are connected via a data processing server so as to communicate with each other, each of said computing servers containing a CPU, memory, and a disk as resources, said server resource usage display apparatus comprising:

a processing capacity ratio management table, provided in said data processing server, to store processing capacity ratios among said computing servers, the processing capacity ratios being obtained with respect to at least one of the CPU, the memory and the disk by applying common criteria on each of said computing servers;

a resource usage status management table, provided in said data processing server, to store resource usage status data obtained from each of said comprising servers, the resource usage status data being taken repeatedly at a predetermined time interval for each server with respect to at least one of the CPU, the memory and the disk;

a data processor to apply the processing capacity ratios onto the resource usage status data so as to obtain comparable resource usage status data among said computing servers; and a plurality of displays provided in each of said clients for displaying the comparable resource usage status data of said computing servers.

6. The server resource usage display apparatus according to claim 5 wherein said data processing means is provided in each of said clients.

7. The server resource usage display apparatus according to claim 5 wherein said data processing means is provided in said data processing server.

8. The server resource usage display apparatus according to claim 5 wherein said data processing server further includes means for updating said processing capacity ratios stored in said processing capacity ratio management table each time a change occurs in the processing capacity of at least one of said CPU, memory or disk in any one of said plurality of servers.

9. The server resource usage display apparatus according to claim 5 wherein said display displays the status of resource usage of said computing servers based on the usage percentage of at least one of said CPU, memory or disk in each of said computing servers.

10. The server resource usage display apparatus according to claim 5 wherein said display displays the status of resource usage of said computing servers based on the free percentage of at least one of said CPU, memory or disk in each of said computing servers.

11. The server resource usage display apparatus according to claim 5 wherein said processing capacity ratios are obtained with respect to said CPU on the basis of the processing time required when an identical program is run on each of said computing servers a prescribed number of times.

12. The server resource usage display apparatus according to claim 5 wherein said processing capacity ratios are obtained with respect to said memory on the basis of the processing time required when identical data is written to and read from each of said computing servers a prescribed number of times.

13. The server resource usage display apparatus according to claim 5 wherein said processing capacity ratios are obtained with respect to said disk on the basis of the processing time required when identical data is written to and read from each of said computing servers a prescribed number of times.

14. A display apparatus for displaying resource usage status of computing servers in a network comprising a plurality of said computing servers having different performance capabilities and containing a CPU, memory and a disk and a plurality of clients connected via a data processing server so as to enable communication with each other, said display apparatus comprising:

a device that measures processing capacity ratios among said plurality of computing servers using common criteria applied to each server for at least one of the CPU, the memory and the disk as resources;

a measuring device that repeatedly measures resource usage status data of each of said computing servers at a predetermined time interval with respect to at least one of the CPU, the memory and the disk;

a device that applies said processing capacity ratios onto said resource usage status data so as to obtain comparable resource usage status data among said computing servers; and a display that displays said comparable resource usage status data among said computing servers at each of said clients.

15. A server usage display apparatus for displaying resource usage status of computing servers containing a CPU, memory and a disk in a network comprising:

a plurality of computing servers having different performance capabilities and a plurality of clients, connected by a data processing server so as to be able to communicate with each other;

a processing capacity ratio management table, provided in said data processing server, that stores processing capacity ratios among said computing servers, said processing capacity ratios being obtained by using common criteria applied to each server for at least one of the CPU, the memory and the disk as resources in each of said computing servers;

a resource usage status management table, provided in said data processing server, that stores resource usage status data obtained from each of said computing servers, said resource usage status data being taken repeatedly at a predetermined time interval with respect to at least one of the CPU, the memory and the disk;

a data processing device that applies said processing capacity ratios onto said resource usage status data so as to obtain comparable resource usage status data among said computing servers; and a plurality of displays provided in each of said clients for displaying said comparable resource usage status data of said computing servers.

* * * * *